May 25, 1926.
W. C. PARMLEY
1,585,785
MOLDING APPARATUS FOR CONCRETE ARTICLES
Filed March 1, 1924      2 Sheets-Sheet 1
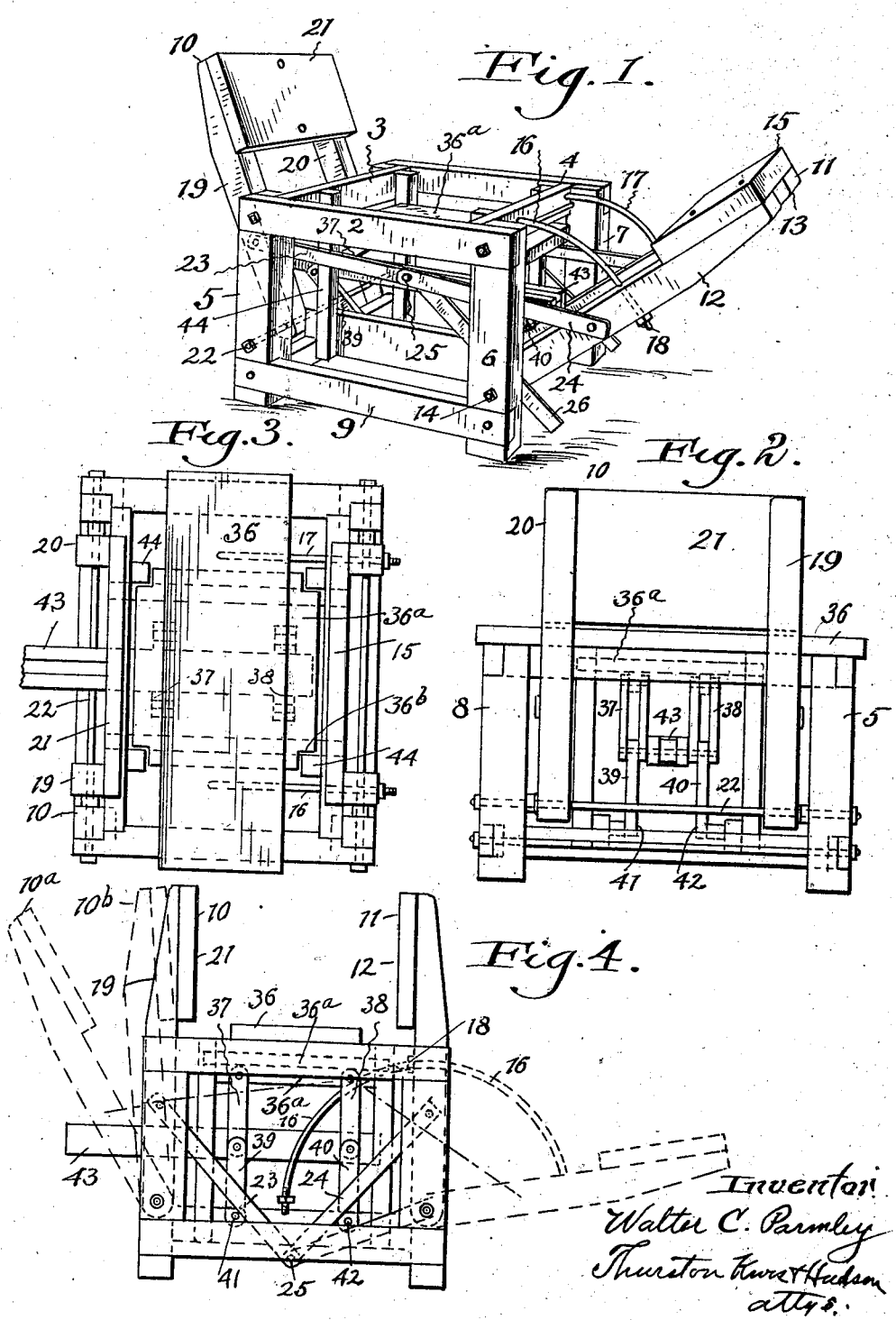

May 25, 1926.  
W. C. PARMLEY  
1,585,785  
MOLDING APPARATUS FOR CONCRETE ARTICLES  
Filed March 1, 1924   2 Sheets-Sheet 2

Inventor  
Walter C. Parmley  
Thurston Kwist Hudson  
attys.

Patented May 25, 1926.

1,585,785

UNITED STATES PATENT OFFICE.

WALTER C. PARMLEY, OF UPPER MONTCLAIR, NEW JERSEY.

MOLDING APPARATUS FOR CONCRETE ARTICLES.

Application filed March 1, 1924. Serial No. 696,133.

The present invention relates to a machine having movable parts to which may be attached parts of molds more particularly designed for molding concrete articles.

The object of the invention is to produce a machine or apparatus which may carry mold parts and be manually operated, so that parting of the mold with respect to the molded article may be accomplished in a manner to give clear clean surfaces to the article being molded, to permit the use of a cement mixture having greater water content than can be used in connection with hand molding operations, to speed up operation over that attainable by hand operation, and thus on the whole to produce a stronger concrete article and a more perfectly molded one in a shorter space of time.

Another object of the invention is to provide a machine of such character that mold units of different sizes may be utilized in the machine, thus permitting with the one machine a variety of mold sizes to be used, and saving the expense of providing a molding machine for each size of article to be molded.

Further objects of the invention will be noted as the description of the apparatus proceeds.

Figure 5:
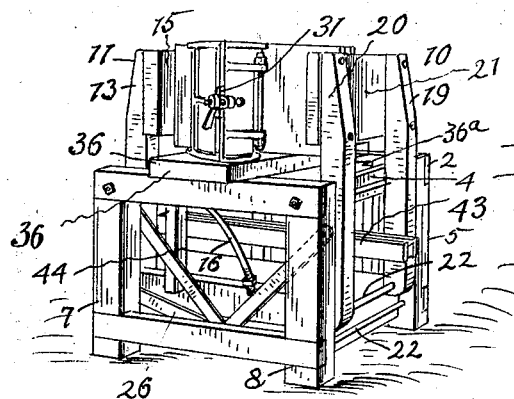
Figure 6:
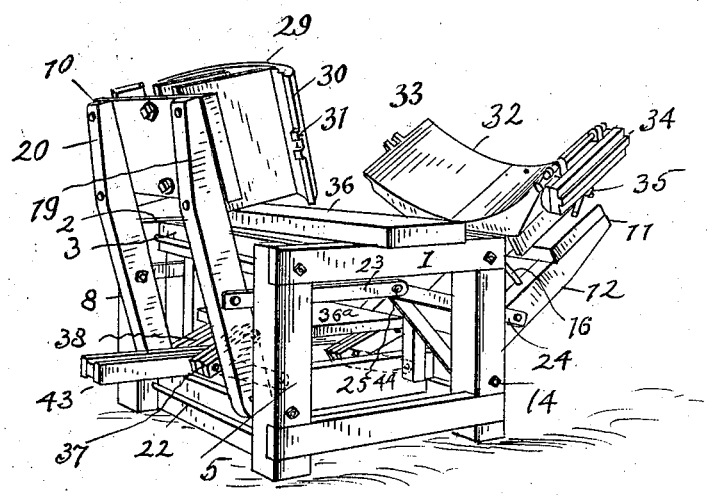

Reference should be had to the accompanying drawings forming parts of the specification, in which Fig. 1 is a perspective view showing the machine in open position; Fig. 2 is an end elevation with the apparatus in closed position; Fig. 3 is a top plan view with a pallet board in place thereon; Fig. 4 is a side elevation of the apparatus in closed position and having the position of the swingable members indicated in their open position; Fig. 5 is a perspective view showing the machine in closed position with a mold in position upon the pallet board. Fig. 6 is a perspective view showing the apparatus in open position and with the swingable members carrying the parts of the mold.

Referring to Fig. 1, the apparatus comprises a rectangular top frame member comprising the side pieces 1 and 2 and the end pieces 3 and 4. The top frame is mounted upon legs 5, 6, 7 and 8, and it will be noted that the end members 3 and 4 of the top frame portion are set in with respect to the side members 1 and 2 substantially the depth of the legs, as for instance will be clearly seen in Fig. 1 in considering the legs 6 and 7.

The legs 5, 6, 7 and 8 at the bottom portions are joined by suitable connecting members, such for instance, as the member 9 shown in Fig. 1.

The construction which has thus been described is merely a frame upon which the swingable members that are to be described may be pivotally mounted.

At each end of the machine there are mounted two swingable members which may be generally represented by the reference characters 10, 11. The swingable member 11 comprises two side members 12 and 13 which at their lower ends are pivoted upon a transversely extending bar or rod the end of which is indicated at 14. This rod or bar 14 extends through the legs 6 and 7 adjacent the lower portions thereof, and when the members 12 and 13 are swung into vertical position these side members engage with the inner surfaces of the legs 6 and 7 and abut against the cross member 4 of the frame which has before been described. These members 11 and 12 at their upper ends are connected by a transversely extending member to which the members 12 and 13 are secured so as to rigidly connect these members.

The outward swinging movement of the member 11 is controlled by means of curved rods 16 and 17, which curved rods are at their opposite ends threaded and receive nuts, such as indicated at 18 in Fig. 4. Therefore the position of the nuts 18 may be regulated and so control the arc of movement of the member 11. The rods 16 and 17 extend through openings in the cross member 4, more particularly shown in Fig. 1, and the nuts 18 which are on the inside of this cross member 4 serve as stop members for the rods with respect to the member 4, while the nuts 18 which are on the opposite ends of the rods 16, 17, serve as stop members for the side members 12, 13 of the member 11. At the opposite end of the frame to that which has been described there is the swinging member 10 which comprises the side members 19, 20, which side members at their outer ends are joined to each other by means of a transversely extending member 21, this being a connection which rigidly holds and spaces the members 19, 20.

At their lower ends the members 19, 20 are mounted on a transversely extending rod 22 which extends between the legs 5 and 8 so that this member 10 as a whole may swing into a vertical position or into an inclined position, as shown in Fig. 1.

Pivotally connected to approximately the mid-position of the side member 19 is a lever 23.

Connected to the side member 12 of the swinging member 11 is a lever 24 which is of equal length with the lever 23. These levers 23, 24, are connected at their inner ends to a pin 25. There is also pivotally connected with the pin 25 a lever 26 which at its opposite end is pivotally connected with the rod 14. The position of the levers 23, 24, and 26 in their open position is shown in Fig. 1 of the drawing, while the position of the levers when the swinging members 10 and 11 are in vertical position is shown in Fig. 4.

It will be seen that because of the connection between the swinging members 10 and 11 through the levers 23, 24, one will move whenever the other movable member is moved, as for instance, by the operator of the machine.

Assuming that the swinging members 10 and 11 are in the position shown in Fig. 4, that is to say, in upright position, if the member 11 be moved toward its open position the member 10 will first move backwardly to approximately the position indicated in $10^a$, and then as the swinging member 11 comes to its full outward swung position the swinging member 10 moves to a position which is almost vertical, as shown in dotted lines at $10^b$.

The determining position of the swinging member 11, that is to say, the extent to which it is swung outwardly, is determined by the fact that it is desired to give clearance so that when a formed concrete article is lifted out of the machine it may easily clear the swinging member 11.

It will be understood that the lever mechanism 23, 24 and 26 is duplicated on the opposite side of the machine, so that the swinging members 10 and 11 are guided at both of their sides simultaneously.

In Figs. 5 and 6 the machine is shown with mold members attached thereto. It will be understood that these mold members are but illustrative of any kind of mold members that may be used, and their description in this specification is not intended to be limiting in any way. As shown, the swinging member 10 carries a half of a mold, indicated at 29, which is rounding in contour, and has a front portion 30 which carries a part 31 to receive a locking member.

The swinging member 11 receives a half mold 32 which is rounding in character. One end is provided with a part 33 to receive a clamping member carried by the end of the mold member 29, which end is obscured in the showing in Fig. 6. The mold member 32 has a swinging portion 34 which carries a pivoted locking member 35.

There is shown in Figs. 5 and 6 a pallet board which is indicated at 36. This pallet board may be supported upon the end members of the frame, and when the mold is closed, as shown in Fig. 5, the pallet board forms a closure for the lower end of the mold. The cementitious molding material may be filled in the mold and properly tamped, and immediately the mold may be opened in the manner which has before been described, whereupon the workmen may lift the pallet board 36 toward the swinging member 11 which will be insufficiently low position to enable the pallet board to move over the top thereof.

Attention is called to the fact that when the swinging member 11 is moved by an operator and it causes the simultaneous movement of the swinging member 10, that both of the mold members in leaving the pallet have a combined upward and backward movement with respect to the molded article, and the mold members leave the surface of the molded article at precisely the same instant. This is important in that it reduces any suction between the moist walls of the concrete article and the mold, and the mold sections instead of having a pulling action which might tend to pull particles of the concrete out, have such an action by the combined movement which has been described, that they leave the walls of the concrete article with a clean surface.

The above described feature of the molding machine is important from another standpoint in that a wetter concrete can be used than is possible with straight hand molding. The wet concrete is desirable to be used in that it produces a concrete article of maximum strength, which is of course desirable.

An additional advantage in the machine which has been described lies in the fact that the mold sections are not man-handled, but being mounted as they are and movable as they are, are much more readily manipulated than would be the case by man handling.

In the event that the concrete article being produced is cored out, it is of course necessary to provide a core which may be operated and withdrawn from the molded article when it is in the machine.

There is shown in the drawings a construction in connection with the machine which has been described by which a raising and lowering table which may carry a core may be provided. This table is indicated at 36ª, and is supported upon two sets of toggle members; the sets at each end of the table member 36ª being the same a description of one will suffice for both.

On the under side of the table there are pivotally connected double link members 37 and double link members 38. At the lower ends of these double link members there are pivotally connected single link members 39 and 40, the lower link members 39 and 40 being pivotally connected to a suitable portion of the frame, as indicated at 41 and 42. Extending transversely of the machine is a pusher member 43 which pusher member on manipulation of this member 43 will serve to straighten the toggle levers in which event the platform 36ª is raised to its uppermost position, and when the member 43 is moved by a push it will serve to break the toggle levers and so lower the platform 36ª.

Each corner of the platform 36ª is notched out, as indicated at 36ᵇ, and co-operating with each notched out corner is a guide bar such as indicated at 44, so that the vertical movement of the table 36ª is guided by the four guide bars which have been mentioned. It will of course be readily understood that the table 36ª need only be used in the event that the molded article is cored out.

Having described my invention, I claim:—

1. A molding apparatus for concrete articles comprising a frame, a pair of oppositely disposed moving members connected for simultaneous movement in opposite directions, means connecting said members whereby the movement of one causes the movement of the other, complemental mold sections carried by said members, each section having a side member attached to one of said swinging members and an end member hinged to the said side member, and means for securing the hinged end member to each section to the attached side member of the other.

2. A molding apparatus for concrete articles comprising a frame, a pair of oppositely disposed vertically swinging members connected for simultaneous movements in opposite directions, means connecting said members whereby the movement of one causes the movement of the other, complemental mold sections carried by said members, each section having a side member attached to one of said swinging members and an end member hinged to the said side member, and means carried by the mold sections for detachably securing the hinged end member of each section to the attached side member of the other section.

3. A molding apparatus for concrete articles comprising a frame adapted to support a pallet board, a pair of oppositely disposed swinging members which are pivotally mounted upon said frame and which swing inwardly toward the pallet board, which swinging members are adapted to carry mold sections, means connecting said members whereby the movement of one of said members causes the movement of the other, and means for controlling the movement of said connecting means to cause one of said members to have a greater angular movement away from the frame than the other of said members.

4. A molding apparatus for concrete articles comprising a frame, a pair of oppositely disposed swinging members adapted to carry mold sections, said members being pivoted to the frame at opposite sides thereof, means connecting the said swinging members whereby the movement of one swinging member controls the movement of the other, means controlling the movement of the connecting means to cause the swinging members to swing apart and then to swing simultaneously in the same direction, and means for limiting the movement of one of the swinging members.

5. A molding apparatus for concrete articles comprising a frame, a pair of oppositely disposed swinging members adapted to carry mold sections, a lever pivotally connected with one of said swinging members above its pivot point, a lever pivotally connected to the other of said swinging members above its pivot point said lever members being pivotally secured to each other, a third lever member pivotally secured to the two first mentioned levers at their point of pivot and said third pivot member being also pivotally mounted upon the frame, and means for limiting the swinging movement of one of said swinging members.

6. A molding apparatus for concrete articles comprising a frame adapted to support a pallet board, a pair of opposed vertically swinging members pivoted to the frame below the top thereof and adapted to carry mold sections, a toggle connecting the swinging members and means for shifting the pivot of the toggle vertically and laterally.

7. A molding apparatus for concrete articles comprising a frame adapted to support a pallet board, a pair of opposed vertically swinging members pivoted to the frame below the top thereof and adapted to carry mold sections, a toggle connecting the swinging members and an operating lever pivoted to the frame and to the pivot of the toggle.

8. A molding apparatus for concrete articles comprising a frame adapted to support a pal'et board, a pair of opposed vertically swinging members pivoted to the frame below the top thereof and adapted to carry mold sections, a toggle connecting the swinging members, means for shifting the pivot of the toggle vertically and laterally, and means for limiting the swinging movement of one of said swinging members.

In testimony whereof, I hereunto affix my signature.

WALTER C. PARMLEY.